United States Patent [19]

Horner

[11] Patent Number: 5,040,140

[45] Date of Patent: Aug. 13, 1991

[54] SINGLE SLM JOINT TRANSFORM CORREALTORS

[75] Inventor: Joseph L. Horner, Cambridge, Mass.

[73] Assignee: The United States of America as represented by the Secretary of the Air Force, Washington, D.C.

[21] Appl. No.: 350,176

[22] Filed: Apr. 28, 1989

[51] Int. Cl.[5] ..................... G06E 3/00; G02B 27/42; G06F 15/336

[52] U.S. Cl. ..................... 364/822; 382/42; 359/561

[58] Field of Search ..................... 364/819-822; 350/3.6, 162.12, 162.13, 162.14; 382/42

[56] References Cited

U.S. PATENT DOCUMENTS

| | | | |
|---|---|---|---|
| 4,357,676 | 11/1982 | Brown | 364/822 |
| 4,490,849 | 12/1984 | Gromet et al. | 350/162.13 |
| 4,637,056 | 1/1987 | Sherman et al. | 350/162.13 |
| 4,669,054 | 5/1987 | Schlunt et al. | 364/822 |
| 4,670,854 | 6/1987 | Mossberg et al. | 364/822 |
| 4,695,973 | 9/1987 | Yu | 364/822 |
| 4,804,250 | 2/1989 | Johnson | 364/822 |
| 4,832,447 | 5/1989 | Javidi | 364/822 |
| 4,837,843 | 6/1989 | Owechko | 382/42 |
| 4,869,574 | 9/1989 | Hartmann | 364/822 |

*Primary Examiner*—Jerry Smith

*Assistant Examiner*—Jim Trammell

*Attorney, Agent, or Firm*—Robert L. Nathans; Donald J. Singer

[57] ABSTRACT

A simple, low cost, high performance joint Fourier transform correlator, which requires only a single spatial light modulator, is disclosed. Input and reference images are recorded upon a single phase modulating SLM, and a lens produces a first joint Fourier transform of the images upon an electro-optic sensor. The first Fourier transform is binarized and recorded upon the single SLM electronically, and the same lens produces a second Fourier transform to form an image correlation signal at a correlation plane. Also, recordation of the input and reference images and recordation of the joint Fourier transform upon the single SLM may be performed optically rather than electronically.

34 Claims, 3 Drawing Sheets

SINGLE SLM JOINT TRANSFORM CORREALTORS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical joint transform correlators. Joint transform correlators (JTC) can be used to match an input image being viewed in real time with a plurality of reference images. See U.S. Pat. No. 4,357,676 issued to Hugh Brown, and U.S. Pat. No. 4,695,973 issued to F. T. S. Yu.

It has been shown previously that binary joint transform correlators can produce very good correlation performance. See B. Javidi and C. J. Kuo, "Joint Transform Image Correlation using a Binary Spatial Light Modulator at the Fourier Plane," Applied Optics, Vol. 27, No. 4, 66–665 (1988); and see B. Javidi and S. F. Odeh, "Multiple Object Identification by Bipolar Joint Transform Correlation," Optical Engineering, Vol 27, No. 4, 295–300 (1988). The binary JTC uses nonlinearity at the Fourier plane to binarize the Fourier transform interference intensity to only two values, +1 and −1. The performance of the binary JTC has been favorably compared to that of the classical JTC, (C. S. Weaver and J. W. Goodman, "A Technique for Optically Convolving Two Functions," Applied Optics, Vol. 5, No. 7, 1248–1249 (1966)) in the areas of light efficiency, correlation peak to sidelobe ratio correlation width, and cross-correlation sensitivity. The motivation for binarizing the interference intensity has been the good correlation performance obtained by binary phase-only filter-based optical correlators. See J. L. Horner and P. D. Gianino, "Phase-only matched filtering," Applied Optics, Vol. 23, No. 6,812–816 (1984); J. L. Horner and J. R. Leger, "Pattern recognition with binary phase-only filters," Applied Optics, Vol. 24, No. 5, 609–611 (1985); and J. L. Horner and H. O. Bartelt, "Two-bit correlation," Applied Optics, Vol. 24, No. 18, 2889–2893 (1985).

SUMMARY OF PREFERRED EMBODIMENTS OF THE INVENTION

It is an object of the present invention to provide a joint transform correlator which requires only a single spatial light modulator in contrast with prior art correlators. This results in significant reduction in cost, size and complexity of the correlator, which additionally outperforms prior art systems.

Input and reference images are recorded upon a single phase modulating SLM and a lens produces a first joint Fourier transform of the images upon an electro-optic sensor. The first transform is binarized and recorded upon the single SLM electronically, and the same lens produces a second Fourier transform to form an image correlation signal at a correlation plane.

In a second embodiment of the invention, recordation of the input and reference images and recordation of the joint Fourier transform upon the single SLM are performed optically rather than electronically.

Other objects, features and advantages will become apparent upon study of the following description, taken in conjunction with the drawings in which.

DETAILED DESCRIPTION OF EMBODIMENTS OF THE INVENTION

Figure 1:
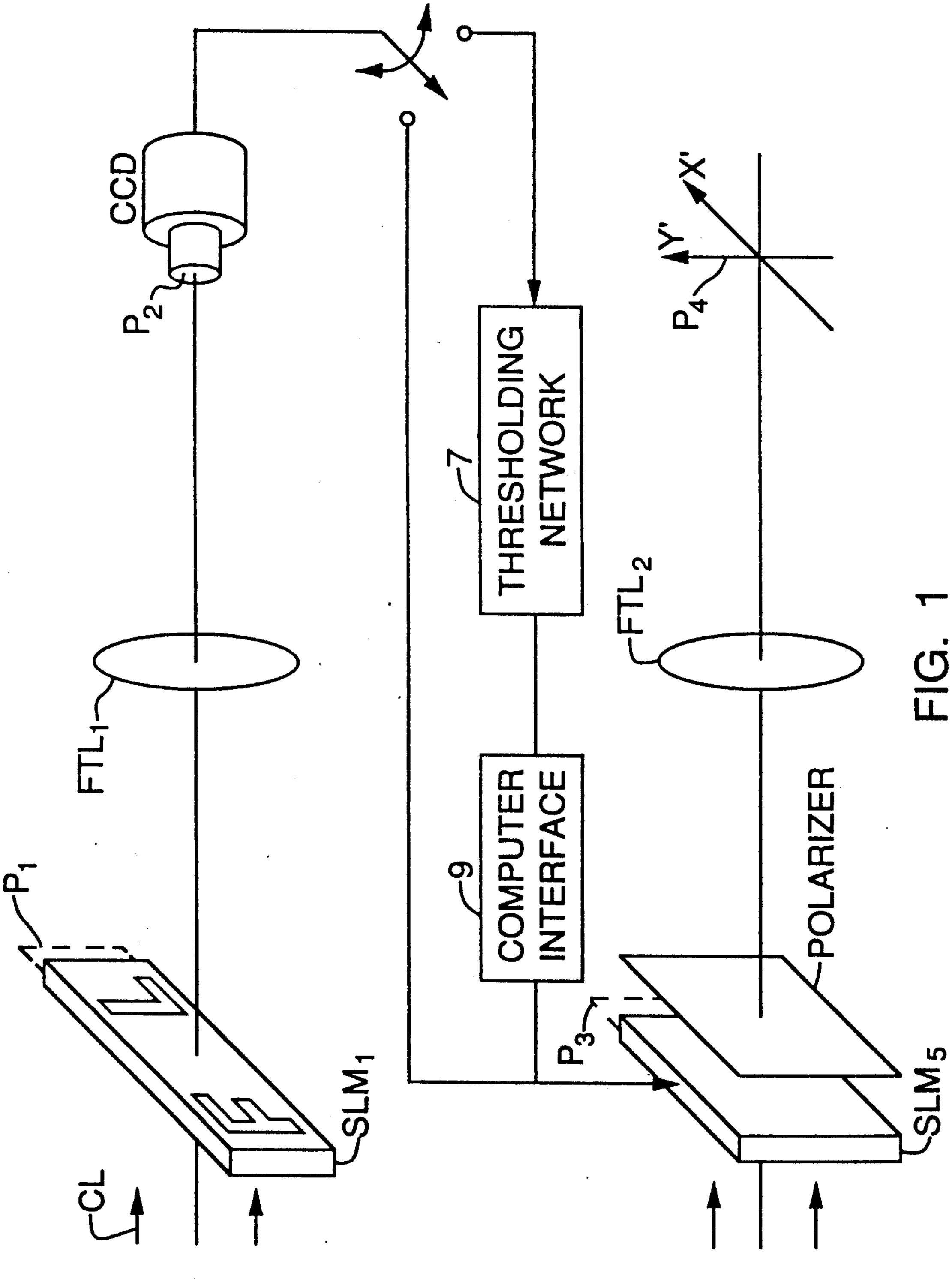
FIG. 1 (PRIOR ART)
FIG. 1 illustrates a prior art correlator.

A prior art joint transform image correlator is shown in FIG. 1. Plane $P_1$ is the input plane that contains the reference signal and the input signal displayed on an electrically addressed SLM 1. The images enter the input SLM and are illuminated by coherent light CL, and are then Fourier transformed by lens $FTL_1$. The interference between the Fourier transforms is produced at plane $P_2$, coincident with an electro-optic image sensor such as a charge coupled array or device (CCD) 3. In the classical joint Fourier transform correlator, a second SLM 2 is located at plane $P_3$ to read out the intensity of the Fourier transform interference. The correlation functions can be produced at plane $P_4$ by having lens $FTL_2$ take the inverse Fourier transform of the interference intensity distribution at plane $P_3$.

The reference and the input signals located at plane $P_1$ are denoted by $S_1(x+x_o,y)$ and $S_2(x-x_o,y)$, respectively. The light amplitude distribution at the back focal plane $P_2$ of the transform lens $FTL_1$ is the interference between the Fourier transforms of the input and reference functions, i.e., $$G(\alpha,\beta) = S_1\left(\frac{2\pi}{\lambda f}\alpha, \frac{2\pi}{\lambda f}\beta\right)\exp\left(-i\frac{2\pi}{\lambda f}x_o\alpha\right) + S_2\left(\frac{2\pi}{\lambda f}\alpha, \frac{2\pi}{\lambda f}\beta\right)\exp\left(i\frac{2\pi}{\lambda f}x_o\alpha\right), \quad (1)$$

where $(\alpha, \beta)$ are the spatial frequency coordinates, $S_1(.)$ and $S_2(.)$ corresond to the Fourier transforms of the input signals $S_1(x,y)$ and $S_2(x,y)$, respectively, f is the focal length of the transform lens, and $\lambda$ is the wavelength of the illuminating coherent light.

The Fourier transform interference intensity distribution can be written as:

$$|G(\alpha,\beta)|^2 = \left|S_1\left(\frac{2\pi}{\lambda f}\alpha, \frac{2\pi}{\lambda f}\beta\right)\right|^2 + \left|S_2\left(\frac{2\pi}{\lambda f}\alpha, \frac{2\pi}{\lambda f}\beta\right)\right|^2 + S_1\left(\frac{2\pi}{\lambda f}\alpha, \frac{2\pi}{\lambda f}\beta\right)S_2^*\left(\frac{2\pi}{\lambda f}\alpha, \frac{2\pi}{\lambda f}\beta\right)\exp\left(-i\frac{2\pi}{\lambda f}2x_o\alpha\right) + S_1^*\left(\frac{2\pi}{\lambda f}\alpha, \frac{2\pi}{\lambda f}\beta\right)S_2\left(\frac{2\pi}{\lambda f}\alpha, \frac{2\pi}{\lambda f}\beta\right)\exp\left(i\frac{2\pi}{\lambda f}2x_o\alpha\right). \quad (2)$$

In the classical case, the the last two terms in the inverse Fourier transform of Eq. (2) can produce the correlation signals at the output plane. The output signals in plane $P_4$ are $$g(x',y')=R_{11}(x',y')+R_{22}(x',y')+R_{12}(x'-2x_o,y')+R_{21}(x'+2x_o,y'), \quad (3a)$$

where $$R_{ij}(x',y')=\int s_1(x'-x,y'-y)s_2(x',y')dx'dy',\ i,j=1,2. \quad (3b)$$

and the terms $R_{21}$ and $R_{12}$ are the desired correlation signals.

The amplitude of the input signal and the reference signal are binarized to two values (+1 and −1) to increase the light efficiency at the input plane. The threshold for the binarization of the input signals is typically chosen to be the average pixel intensity value.

The output correlation signals for the binary input classical JTC case are $$gb(x',y')=R_{11b}(x',y')+R_{22b}(x',y')+R_{12b}(x'-2x_o,y')+R_{21b}(x'2x_o,y') \quad (4)$$

Here, $R_{ijb}$ corresponds to the correlation between the thresholded input and reference signals [see Eq. (3b)].

In the binary JTC, the Fourier transform interference intensity provided by CCD array is thresholded before the inverse Fourier transform operation is applied. The CCD array at the Fourier plane is connected to SLM 2 through a thresholding network 7 and interface 9 so that the binarized interference intensity distribution can be read out by coherent light. The interference intensity is binarized according to the following equation $$H(\alpha,\beta)=\begin{cases}+1 \text{ if } |G(\alpha,\beta)|^2 \geqq v_{tb}\\ -1 \text{ otherwise.}\end{cases} \quad (5)$$

Here, $H(\alpha,\beta)$ is the binarized interference intensity, $G(\alpha,\beta)$ $^2$ is the interference intensity given by Eq. (2), and $v_{tb}$ is the threshold value. The threshold for binarization of the Fourier transform interference intensity can be set by making the histogram of the pixel values of the interference intensit and then picking the median. The correlation signals can be produced by taking the inverse Fourier transform of the binarized interference intensity given by Eq. (5)

$$g(x',y')=\int H(\alpha,\beta)\exp[i(x\alpha+y\beta)]d\alpha d\beta. \quad (6)$$

A recent theoretical study shows that the correlation signal obtained by this technique is similar to what would be obtained by inverse filtering in the Fourier transform plane.

Figure 2:
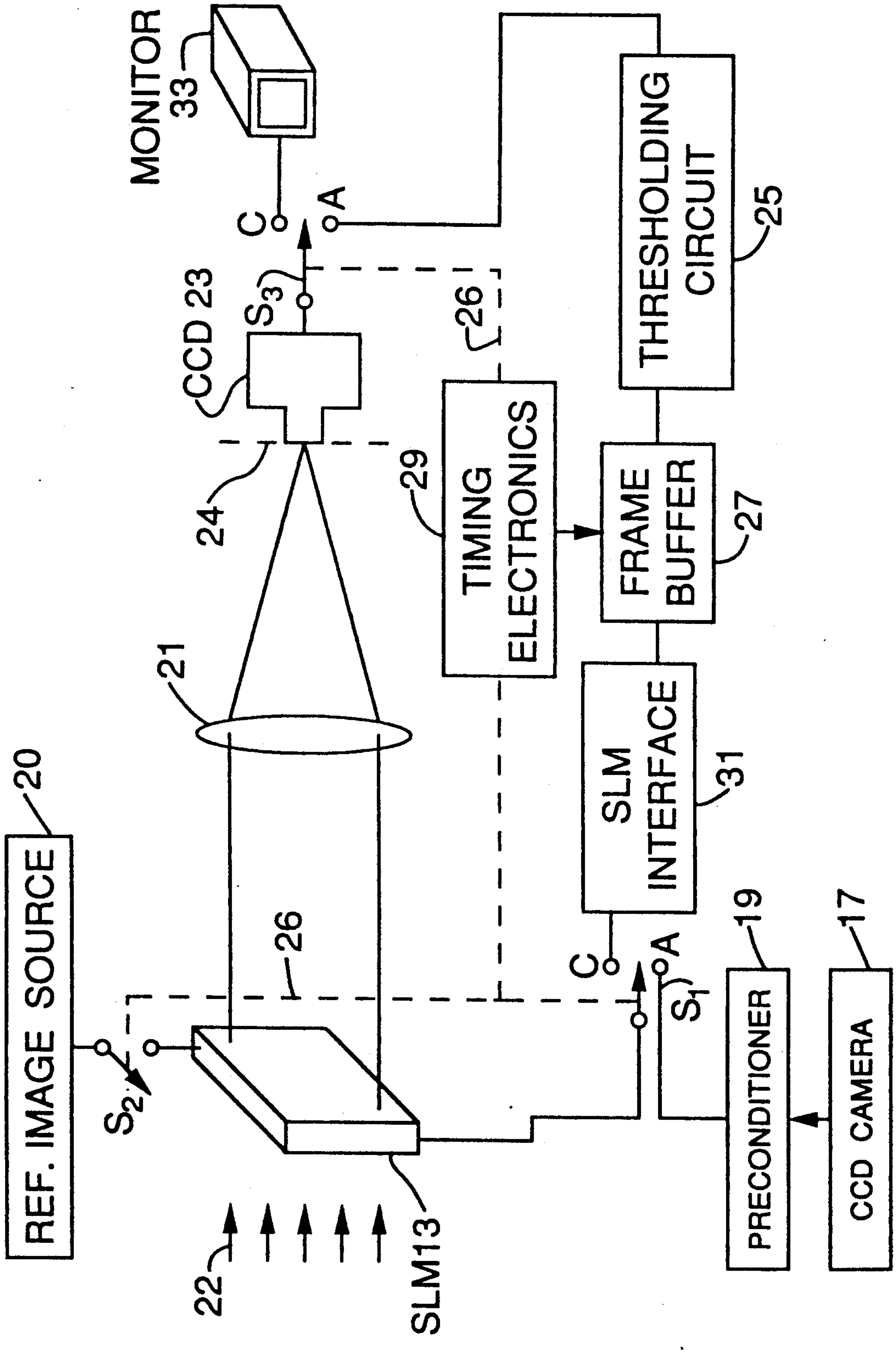
FIG. 2 illustrates the first embodiment of the invention wherein the first Fourier transform is recorded upon the SLM electronically.

As shown in FIG. 2, single SLM 13 is used to display both the thresholded input signals and the thresholded Fourier transform interference intensity. The thresholded input and reference signals enter SLM 13 via switches $S_1$ and $S_2$, which SLM operates in the binary mode. More specifically, an input image may be viewed and converted into electrical signals by a CCD camera 17, which signals are preconditioned by unit 19. The input signals are energy normalized to avoid false correlations; that is substantial swings in the light intensit of the image are eliminated. The image data is also binarized by conventional thresholding to match the input requirements of SLM 13. Algorithms for performing these functions are well known in the art.

A library of reference images from source 20 are recorded in SLM 13 to be correlated with the input signal, as described in the aforesaid U.S. Pat. No. 4,695,973. Switch $S_2$ would be in the closed position during this operation. The interference pattern formed at plane 24, between the Fourier transforms of the input and reference signals is obtained using lens (transformation means) 21 and a CCD image sensor 23, to produce the transform interference intensity distribution. The interference intensity is then thresholded by unit 25 to only two values, +1 and −1, $S_3$ being in the A (acquire) position. The binarized interference intensity is then recorded on the same SLM 13 and FTL lens 21 takes the inverse Fourier transform of the thresholded interference intensity pattern in SLM 13.

More specifically, SLM 13 is of the binary phase modulating type, where each pixel modulates the light going through by +1 or −1. With switch $S_1$ in the A, or acquire, position, the binarized input signal from unit 19 is written on the SLM. The input signals are thresholded according to a predetermined threshold value ($v_{ti}$) to only two values, +1 and −1. Coherent light 22 incident on the SLM in conjunction with FTL lens 21 produces the first Fourier transform interference pattern of the binarized images:

$$|G_b(\alpha,\beta)|^2=\left|S_{1b}\left(\frac{2\pi}{\lambda f}\alpha,\frac{2\pi}{\lambda f}\beta\right)\right|^2+\left|S_{2b}\left(\frac{2\pi}{\lambda f}\alpha,\frac{2\pi}{\lambda f}\beta\right)\right|^2+S_{1b}\left(\frac{2\pi}{\lambda f}\alpha,\frac{2\pi}{\lambda f}\beta\right)S_{2b}^*\left(\frac{2\pi}{\lambda f}\alpha,\frac{2\pi}{\lambda f}\beta\right)\exp\left(-i\frac{2\pi}{\lambda f}2x_o\alpha\right)+S_{1b}^*\left(\frac{2\pi}{\lambda f}\alpha,\frac{2\pi}{\lambda f}\beta\right)S_{2b}\left(\frac{2\pi}{\lambda f}\alpha,\frac{2\pi}{\lambda f}\beta\right)\exp\left(i\frac{2\pi}{\lambda f}2x_o\alpha\right), \quad (7)$$

where $S_{1b}(.)$ and $S_{2b}(.)$ are the Fourier transforms of the binarized input signals $S_{1b}(.)$ and $S_{2b}(.)$, respectively. CCD image sensor 23 detects this intensity pattern, sends it to thresholding circuit 25 where it is thresholded about the value $v_u$. The thresholded interference intensity is $$H_b(\alpha,\beta)=\begin{cases}+1 \text{ if } |G_b(\alpha,\beta)|^2 \geqq v_u\\ -1 \text{ otherwise.}\end{cases} \quad (8)$$

where $v_u$ is the threshold value used to binarize the interference intensity. It is noted that $v_u$ is different from $v_{tb}$ used in Eq. (5).

The binarized Fourier transform interference intensity array is temporarily stored in a conventional frame grabber or buffer 27, which constitutes a second recording means. Timer 29 now switches $S_1$ and $S_3$ to the C, or correlate, position and $S_2$ is opened. The data array in frame buffer 27 is now recorded on the SLM via 31, where again it binary modulates the phase of the incident coherent light. FTL Lens 21 now takes a second Fourier transform and produces a (inverted) correlation signal in the Fourier plane 24 where it is read out by CCD detector 23 and can be displayed on a TV monitor 33, as $S_3$ was switched to the C (correlate) position. If the overall speed of the correlator is to be the standard TV frame rate, then timing circuit 29 will operate at twice the TV frame rate, since it takes two switching sequences to produce one correlation.

We have tested four cases of JTC: (1) the classical JTC which does not use thresholding at the input plane nor at the Fourier plane, (2) JTC that uses thresholding at the input plane to binarize the input signals, (3) binary JTC that uses thresholding at the Fourier plane to binarize the interference intensity, and (4) single SLM JTC of the above described embodiment of the present invention that employs thresholding at both the input plane and the Fourier plane to binarize the input signals and the Fourier transform interference intensity, respectively.

We used a 512×512 point 2-D fast Fourier transform (FFT) to study the performance of the proposed systems, and the results were plotted using a 3-D plotting subroutine. The median of the normalized pixel values of the input signals is 0.334. The median of the pixel values of the interference intensity is $1.14\times10^{-6}$ when the input is not binarized and is $9.65\times10^{-5}$ when the input is binarized.

Table I below illustrates the results of the correlation tests for the four JTC configurations. In this table, $R_o^2$ is the correlation peak intensity relative to that of the classical correlator with continuous input normalized to unity, $R_o^2/SL^2$ is the ratio of the correlation peak intensity to the maximum correlation sidelobe intensity, FWHM is the full correlation width at half maximum, and CW is the full correlation width. FWHM is determined by evaluating the points where the correlation intensity drops to one-half of its peak value, and CW is determined by evaluating the points where the correlation intensity drops to the first minimum.

The signal-to-noise ratio (SNR) is defined as the ratio of the correlation peak amplitude to the RMS value of the noise, i.e., $$SNR = \frac{[R(x_i,y_j)]_{max}}{\left[\sum_{i=1}^{N_i}\sum_{j=1}^{N_j}|n(x_i,y_j)|^2/N_iN_j\right]^{\frac{1}{2}}}, \quad (9)$$

where $[R(x_i,y_j)]$ max is the correlation peak amplitude, $n(x_i,y_j)$ is the noise amplitude outside of the FWHM response of the correlation peak, and $N_i$ and $N_j$ are the total number of pixels in this sample.

TABLE 1

Correlation results.

| Case | Joint Transform Correlator | $R_o^2$ | $R_o^2/SL^2$ | SNR | FWHM (x', y') | CW (x', y') |
|---|---|---|---|---|---|---|
| 1. | Classical JTC. Continuous input signal and nonbinarized FTII | 1.00 | | 5.67 | (36, 40) | (96, 114) |
| 2. | Classical JTC. Binarized input signal and nonbinarized FTII | 27.57 | 3.35 | 11.12 | (1, 3) | (12, 11) |
| 3. | Binary JTC. Continuous input signal and binarized FTII | $1.18\times10^6$ | 65.98 | 26.65 | (1, 1) | (3, 3) |
| 4. | Single SLM correlator. Binarized input signal and binarized FTII | $2.81\times10^6$ | 105.83 | 33.77 | (1, 1) | (3, 3) |

It can be seen from Table 1 that the best results are obtained for the single SLM correlator [case 4], i.e., when both the input signals and the Fourier transform interference intensity are binarized. The second best results are obtained by the binary JTC where the Fourier transform interference intensity is binarized [case 3]. The classical JTC which does not use thresholding at the Fourier plane [case 1] produces the worst results. Some improvement in the performance of the classical JTC can be obtained by binarizing the input signals [case 2]. A similar result was described in the above cited article by Bartelt and Horner.

Table I shows that the single SLM JTC of the first embodiment of the invention has a significantly higher correlation peak intensity compared to that of the classical JTC. The classical JTC has a correlation peak intensity of unity, whereas the single SLM JTC has a peak intensity value of $2.81\times10^6$. The detector output voltage can be expected to be higher by the same factor, all other things being equal. This is important for reducing the effects of the detector noise. The correlation sidelobes were reduced considerably for the single SLM JTC case. The classical JTC has a peak intensity to sidelobe intensity ratio of 1.00, whereas the single SLM JTC has a peak to sidelobe ratio of 105.83.

It is evident from Table I that binarizing the interference intensity has resulted in a significant reduction in the correlation width and has produced impulse-like autocorrelation functions. The classical JTC has a FWHM of 36×40 pixels and a correlation width of 96×114 pixels in the (x',y') directions. The single SLM JTC has a FWHM and a correlation width of 1×1 pixels in the (x',y') directions.

In summary, a new optical correlator architecture is thus disclosed employing only a single SLM. as compared to the two SLM required in the original JTC. The input signal and the Fourier transform interference intensity are binarized so that a binary SLM can be used to present the input signal and the transform interference intensity. The performance of this single SLM JTC was compared by computer simulations to that of the classical JTC with continuous inputs, the classical JTC with binarized inputs, and the JTC with binarized interference intensity. The results for the four types of correlators are listed in Table I. It was found that the performance of the single SLM JTC of this embodiment of the invention is superior to the other types of correlators. The single SLM JTC has correlation peak intensity $2.81\times10^6$ times greater, an autocorrelation peak to sidelobe ratio 105.83 times higher, a SNR 6 times higher, and a FWHM 38 times narrower than those produced by the classical JTC. The correlator introduced here employs only a single binary phase-only SLM which provides a significant reduction in cost, size, and complexity of the system. Furthermore, since the SLMs are pure phase devices, the light efficiency of the system is excellent. With a recently introduced technique of amplitude encoding, it may be possible to use a far less expensive binary amplitude encoded SLM rather than the more costly standard phase modulating SLM. See U.S. Pat. application No. 07/335,635, entitled "AMPLITUDE ENCODED PHASE ONLY FILTER," filed by Joseph Horner. There would also be a reduction in the memory space required to store the binary reference signals as compared to storing the continuous function reference images. The single SLM correlator introduced here is compatible with current SLMs which work well in the binary mode. The new binary input/binary interference intensity JTC technique introduced here can be used in digital pattern recognition systems using a digital computer and a FFT program. The first embodiment of the present invention is also described in an article authored by the inventors in "Applied Optics" Vol. 28, No. 5; 1 Mar. 1989.

Figure 3:
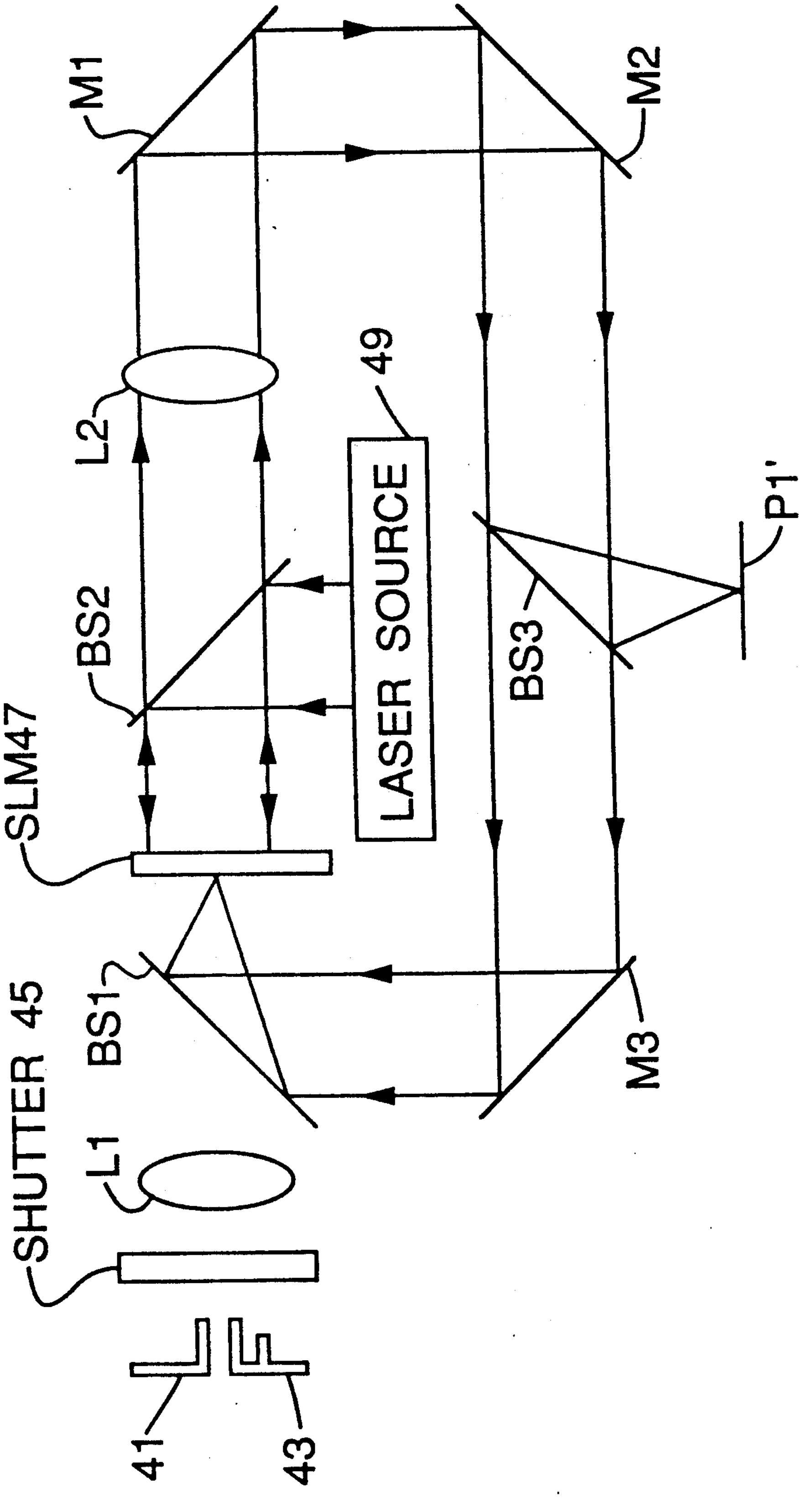
FIG. 3 illustrates the second embodiment wherein the first Fourier transform is recorded upon the SLM optically.

FIG. 3 illustrates a second embodiment of the present invention utilizing an optically addressed SLM 47. Optical input image 43 and reference image 41 are recorded upon SLM 47, upon the opening of shutter 45. Lens L1 focuses these images upon the face of SLM 47 via beamsplitter BS1.

Coherent light from laser source 49 is reflected from beam-splitter BS2 and reads out the aforesaid images in the SLM. This image modulated light propagates back through BS2 and through Fourier transform lens L2. The light is now folded around by three mirrors, M1, M2, M3, and by BS1, so that the squared value of the Fourier transform of the joint input signals is recorded on single SLM 47. The lens L2 again takes the Fourier transform of the squared value of the joint transform, since this optically addressed SLM only responds to the intensity of the light incident on it, and this light is deflected by mirrors M1 and M2 onto BS3, which deflects some of this light onto plane P1, which is the correlation plane. Three distinct and spatially separated signals appear here; an on-axis or DC term which is of no particular interest, and two indentical off-axis terms which represent the mathematical correlation between the input and the reference signals.

It may be noted that there is no equivalent in FIG. 3 to the intermediate frame buffer 27 of FIG. 2. Good optical correlation spots will continue to be produced at the correlation plane P1 even through the images 41 and 43 have not been erased from SLM 47, since the Fourier transform light patterns are far stronger than the image signals.

In the first embodiment of the invention, binarizing the input and Fourier transforms is greatly preferred, and may also be employed in the second embodiment. However, it should be appreciated that the "folded back" (in time or space) configurations of FIG. 2 and 3, enable the use of a single SLM to effect substantial savings, and that other less preferred embodiments do not absolutely require such binarization. Thus the scope of the invention is to be defined solely by the terms of the following claims and art recognized equivalents.

We claim:

1. A joint Fourier transform correlator comprising:

(a) first recording means for recording an input image and a reference image upon a single SLM during a first recording interval;

(b) transformation means for thereafter producing a first Fourier transform of said input and reference image recorded upon said single SLM;

(c) second recording means including means for thereafter recording said first Fourier transform upon said single SLM in place of said input image and said reference image during a second recording interval following said first recording interval; and (d) correlation signal producing means including said transformation means for producing a second Fourier transform of said first Fourier transform recorded upon said SLM.

2. The correlator of claim 1 wherein said second recording means includes an electro-optic sensor and an electronic buffer storage means coupled between said electro-optic sensor and said SLM.

3. The correlator of claim 2 wherein said SLM modulates the phase of light outputted therefrom.

4. The correlator of claim 3 wherein said electro-optic sensor records both said first and second Fourier transform.

5. The correlator of claim 2 wherien said electro-optic sensor records both said first and second Fourier transform.

6. The correlator of claim 2 wherein said transformation means is an integral part of said correlation signal producing means so that the same transformation means produces both said first and second Fourier transform.

7. The correlator of claim 6 wherein said electro-optic sensor records both said first and second Fourier transform.

8. The correlator of claim 1 further including means for binarizing said first Fourier transform before being recorded upon said SLM.

9. The correlator of claim 8 wherein said first recording means includes means for binarizing said input image and said reference image.

10. The correlator of claim 9 wherein said SLM modulates the phase of light outputted therefrom.

11. The correlator of claim 9 wherein said transformation means is an integral part of said correlation signal producing means so that the same transformation means produces both said first and second Fourier transform.

12. The correlator of claim 11 wherein said transformation means comprises an optical lens.

13. The correlator of claim 8 wherein said SLM modulates the phase of light outputted therefrom.

14. The correlator of claim 1 wherein said first recording means includes means for binarizing said input image and said reference image.

15. The correlator of claim 14 wherein said SLM modulates the phase of light outputted therefrom.

16. The correlator of claim 1 wherein said SLM modulates the phase of light outputted therefrom.

17. The correlator of claim 16 wherein said transformation means is an integral part of said correlation signal producing means so that the same transformation means produces both said first and second Fourier transform.

18. The correlator of claim 17 wherein said transformation means comprises an optical lens.

19. The correlator of claim 1 wherein said transformation means is an integral part of said correlation signal producing means so that the same transformation means produces both said first and second Fourier transform.

20. The correlator of claim 19 wherein said transformation means comprises an optical lens.

21. The correlator of claim 1 wherein said transformation means comprises a source of coherent light for illuminating said SLM together with optical lens means for producing said first Fourier transform, and said second recording means includes optical relay means for recording said first Fourier transform upon said SLM.

22. The correlator of claim 21 wherein said correlation signal producing means includes said optical lens means so that said lens means produces both said first and second Fourier transform.

23. The correlator of claim 22 wherein said correlation signal producing means includes a beamsplitter included within said optical relay means for retrieving a correlation signal.

24. The correlator of claim 23 wherein said SLM modulates the phase of light outputted therefrom.

25. The correlator of claim 22 wherein said SLM modulates the phase of light outputted therefrom.

26. The correlator of claim 21 wherein said correlation signal producing means includes a beamsplitter included within said optical relay means for retrieving a correlation signal.

27. The correlator of claim 26 wherein said SLM modulates the phase of light outputted therefrom.

28. The correlator of claim 21 wherein said SLM modulates the phase of light outputted therefrom.

29. A method of performing joint Fourier transform correlation of an input image and a reference image, enabling the use of only one SLM comprising the steps of:

(a) providing a single binary phase modulating SLM;

(b) recording input and reference images upon said binary phase modulating SLM;

(c) thereafter producing a first Fourier transform of the input and reference images recorded upon said binary phase modulating SLM;

(d) binarizing said first Fourier transform;

(e) thereafter recording said first Fourier transform binarized in accordance with step (d) upon said single binary phase modulating SLM in place of said input and reference images; and (f) producing a second Fourier transform of said first Fourier transform stored in said single SLM for indicating the degree of similarity between the input and reference image.

30. The method of performing wherein step (b), (d), and (e) are performed electronically.

31. The correlator of claim 30 wherein said first recording means includes means for binarizing said input image and said reference image.

32. The method of claim 29 wherein steps (b) and (e) are performed optically.

33. The correlator of claim 32 wherein said first recording means includes means for binarizing said input image and said reference image.

34. The method of claim 29 wherein steps (c) and (f) are performed by a single optical lens means.

* * * * *

UNITED STATES PATENT AND TRADEMARK OFFICE

CERTIFICATE OF CORRECTION

PATENT NO. : 5,040,140

DATED : 13 August 1991

INVENTOR(S) : Joseph L. Horner; Bahram Javidi

It is certified that error appears in the above-indentified patent and that said Letters Patent is hereby corrected as shown below:

On the title page, item [54] and column 1, line 3, "CORREALTORS" should read -- CORRELATORS --.

Signed and Sealed this

Twenty-third Day of November, 1993

Attest:

BRUCE LEHMAN

Attesting Officer

Commissioner of Patents and Trademarks